United States Patent
Luc et al.

(10) Patent No.: US 9,434,322 B2
(45) Date of Patent: Sep. 6, 2016

(54) TRIM ELEMENT COMPRISING AT LEAST ONE FOAMED CENTRAL AREA AND TOOL FOR PRODUCING SUCH AN ELEMENT

(71) Applicant: Faurecia Interieur Industrie, Nanterre (FR)

(72) Inventors: Patrice Luc, Laboissiere en Thelle (FR); Dominique Desgranges, Auneuil (FR)

(73) Assignee: Faurecia Interieur Industrie, Nanterre (FR)

( * ) Notice: Subject to any disclaimer, the term of this patent is extended or adjusted under 35 U.S.C. 154(b) by 32 days.

(21) Appl. No.: 13/870,672

(22) Filed: Apr. 25, 2013

(65) Prior Publication Data

US 2013/0285405 A1     Oct. 31, 2013

(30) Foreign Application Priority Data

Apr. 25, 2012  (FR) ..................... 12 53777

(51) Int. Cl.
| | |
|---|---|
| *B60R 13/00* | (2006.01) |
| *B29C 33/12* | (2006.01) |
| *B29C 44/12* | (2006.01) |
| *B29C 44/58* | (2006.01) |

(52) U.S. Cl.
CPC ............. *B60R 13/00* (2013.01); *B29C 33/12* (2013.01); *B29C 44/1271* (2013.01); *B29C 44/58* (2013.01)

(58) Field of Classification Search
None
See application file for complete search history.

(56) References Cited

U.S. PATENT DOCUMENTS

| | | | | |
|---|---|---|---|---|
| 4,741,945 | A * | 5/1988 | Brant et al. .................... | 428/158 |
| 6,102,436 | A * | 8/2000 | Bayley et al. ................ | 280/753 |
| 2002/0158365 | A1 | 10/2002 | Blanchon et al. | |
| 2004/0216949 | A1* | 11/2004 | Tompson et al. ............. | 181/204 |
| 2006/0216479 | A1* | 9/2006 | Cowelchuk et al. ......... | 428/174 |
| 2011/0039049 | A1* | 2/2011 | Chow ............................. | 428/71 |

FOREIGN PATENT DOCUMENTS

| | | | | |
|---|---|---|---|---|
| DE | 19928408 | | 7/2000 | |
| EP | 0683366 | A1 | 11/1995 | |
| EP | 1574312 | A2 * | 9/2005 | ............. B29C 44/12 |
| JP | 2003-080972 | A * | 3/2003 | ............. B60K 37/00 |
| JP | 2003080972 | | 3/2003 | |
| WO | WO2005/090048 | A1 | 9/2005 | |

OTHER PUBLICATIONS

Hiroshi, (JP 2003-080972 A). Mar. 19, 2003. [Machine Translation of Disclosure].*
Search Report for FR 1253777, dated Dec. 17, 2012, 3 pages.

* cited by examiner

*Primary Examiner* — David Sample
*Assistant Examiner* — Donald M Flores, Jr.
(74) *Attorney, Agent, or Firm* — Reising Ethington P.C.

(57) ABSTRACT

A trim element that includes a support element having an inner face and an outer face. The support element has at least one central area covered on the outer face thereof by a layer of foam. The support element includes at least one tab protruding from the inner face thereof near the central area, the tab forming a positioning element for positioning the support element in a production tool of the trim element.

7 Claims, 3 Drawing Sheets

TRIM ELEMENT COMPRISING AT LEAST ONE FOAMED CENTRAL AREA AND TOOL FOR PRODUCING SUCH AN ELEMENT

TECHNICAL FIELD

The present invention relates to a trim element comprising a support element, having an inner face and an outer face, said support element comprising at least one central area covered, on the outer face thereof, by a layer of foam.

BACKGROUND

Such a trim element, for example designed to be placed in a vehicle, has at least one localized foam layer, the location of which is chosen by choosing the position of the peripheral wall on the outer face of the support element. A trim element is thus obtained having the desired appearance and which can adapt to its environment by for example having "foamed" areas designed to be visible and other, so-called "technical" areas, which are not foamed and are designed to receive functional elements of the vehicle or to perform a particular function in a vehicle.

Such a trim element is produced by performing "partial" foaming on the outer face of the support element using a suitable production tool, the foaming being done only in the central area(s) where a layer of foam must be located. To that end, the tool for producing the trim element must be adapted to allow that partial foaming by providing one or more foaming cavities only opposite the central area(s) of the support element. A problem arises of positioning the support element in the production tool so as to precisely match the central area(s) of the support element with the foaming cavity or cavities provided in the production tool. To that end, the peripheral wall at least partially surrounding the central area designed to be foamed may be used, since the shape of the foaming cavity is suitable for receiving the peripheral wall in a bearing manner. However, the peripheral wall is not sufficient to ensure correct positioning of the central area in the foaming cavity, which can cause appearance defects in the finished trim element if the foaming has not been done accurately in the central area(s) designed to receive a layer of foam.

To improve the positioning of the support element, and in particular of the central area(s), in the production tool, it is known to provide additional positioning elements in the production tool. FIG. 2 shows such positioning elements produced in the form of lugs A, optionally retractable, extending protruding into the foaming cavity B and designed to be inserted in the corresponding openings C of the support element D and positioned in the central area(s) of the support element. When the lugs A are inserted in the corresponding openings C, this means that the support element is correctly positioned in the production tool and that the foaming can be done without risk of foaming an area of the support element that should not be foamed or without risk of the foam overflowing the central area. In order to prevent foam leakage through the openings C of the support element during foaming, covering elements E are positioned on the outer face of the support element so as to cover the openings C. These covering elements are for example pieces of adhesive sheets or elastic membranes. There are for example four openings C per central area of the support element and an equal number of positioning lugs A.

Such a method for positioning the support element in the production tool is not satisfactory, as it causes an increase in the production cost of the trim element due to the presence of the covering elements and a decreased production rhythm due to the time necessary to position those covering elements on the openings of the support element.

Another method provides for using a particular shape of the support element, and in particular the face thereof pressed against the production tool. However, such a method involves making the shape of the central area dependent on the need to position the support element in the production tool.

SUMMARY

The invention aims to overcome the above-mentioned drawbacks by providing a trim element whereof the support element can be easily positioned in the production tool and whereof the cost is reduced and the production rhythms are satisfactory.

To that end, the invention relates to a trim element of the aforementioned type, wherein the support element comprises at least one tab protruding from the inner face thereof near the central area, said tab forming a positioning element for positioning the support element in a production tool of the trim element.

The positioning tab of the support element extends toward the outside of the central area, which therefore does not need to be pierced to allow the passage of positioning lugs. It is thus possible to avoid adding covering elements, the risks of foam leakage are reduced, and the tab can be used for other functions, such as subsequent positioning and/or fastening of the trim element in a vehicle. The absence of covering elements reduces costs and increases the production rhythm of the trim element. Furthermore, providing tabs making it possible to ensure positioning of the support element in the production tool, instead of adapting the shape of the inner face of the support element, makes it possible not to make the shape of the central area dependent on that need to position the support element, which offers greater freedom in the choice of the shape of the central area.

According to other features of the trim element according to the invention:
- the central area is at least partially delimited by a peripheral wall extending over the outer face of the support element and at least partially surrounding the central area;
- the peripheral wall substantially surrounds the entire central area;
- the tab comprises at least one through opening positioned opposite an area of the support element extending around the central area;
- the foam layer is covered by a skin;
- the skin comprises at least one peripheral area, said peripheral area extending between the foam layer and the peripheral wall of the support element; and
- the support element comprises at least one other central area, said other central area being covered on the outer face thereof by a foam layer, at least one tab extending on the inner face of the support element near said other central area.

The invention also relates to a tool for producing a trim element as described above, comprising at least one foaming cavity delimited by a first inner wall and a second inner wall, said foaming cavity assuming the form of a foam layer to be produced to cover the central area of the support element, the first inner wall being arranged to receive the support element of the trim element, the inner face of the support element being pressed against said first inner wall and the central area being positioned in the foaming cavity, in which said first inner wall comprises at least one area for receiving the tab of the support element, said tab being positioned in said receiving area when the central area of the support element is correctly positioned in the foaming cavity.

According to other features of the production tool according to the invention:

the receiving area comprises a slit for receiving the tab, said slit blocking the support element against the first wall when the tab is inserted into said slit;

the production tool comprises at least one blocking element movable between a retracted position, in which the blocking element extends opposite from the receiving area, and an upright position in which the blocking element extends protruding in the receiving area and in which it is capable of being inserted into an opening of the tab of the support element when the central area of the support element is correctly positioned in the foaming cavity.

BRIEF DESCRIPTION OF THE DRAWINGS

Other aspects and advantages of the invention will appear upon reading the following description, provided as an example and done in reference to the appended drawings, in which.

DETAILED DESCRIPTION OF THE ILLUSTRATED EMBODIMENT(S)

In the description, the terms "inner" and "outer" are defined relative to the orientation of the trim element when it is placed in a vehicle, the term "inner" designating that which is designed to face the body of the vehicle and not to be visible to the occupants of the vehicle, and the term "outer" designating that which is designed to be placed toward the inside of the passenger compartment of the vehicle.

Figure 1:
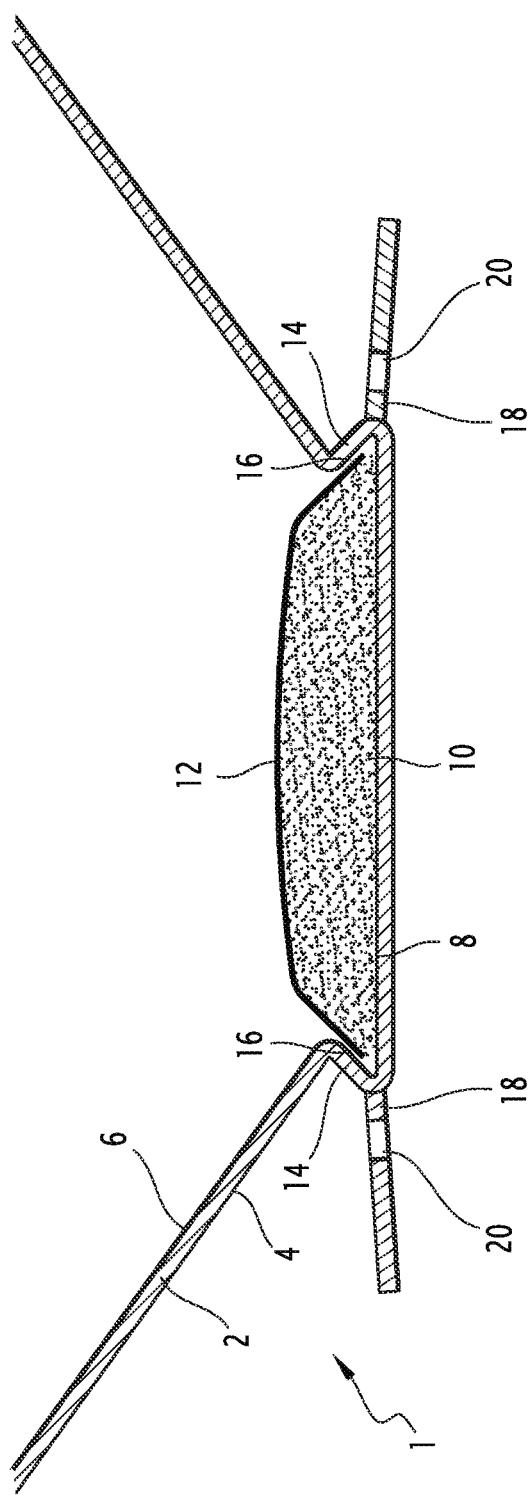
FIG. 1 is a diagrammatic cross-sectional illustration of part of a trim element according to the invention.

In reference to FIG. 1, a trim element 1 is described comprising a support element 2, having an inner face 4 and an outer face 6. The support element 2 is substantially rigid, for example made from an injected plastic or other material, and may have any shape suitable for its use, for example in a vehicle, as a door panel, dashboard or other element.

The support element 2 comprises at least one central area 8, or several central areas, whereof the outer face 6 is covered by a foam layer 10, which in turn may be covered by a skin 12. Such a foam layer 10 and such a skin 12 are traditional in a trim element 1 and will not be described in detail here. The foam layer 10 makes it possible to impart a flexible feel to the trim element and the skin 12 makes it possible to give it a satisfactory appearance. It is understood that the central area 8 is not necessarily placed at the center of the support element 2 and may assume any form whatsoever suitable for use of the trim element.

The central area 8 is at least partially defined by a peripheral wall 14 extending over the outer face 6 of the support element 2 and at least partially surrounding the central area 8. The peripheral wall 14 for example forms a protrusion relative to the outer face 6 of the support element 2, such that it protrudes toward the outside of the support element 2 or the central area 8 forms a hollow portion relative to the rest of the support element 2, as shown in FIG. 1. The peripheral wall 14 may have any shape and height suitable for the appearance and use provided for the trim element 1. According to one embodiment, the peripheral wall 14 surrounds only part of the central area 8. According to another embodiment, the peripheral wall 14 surrounds the entire central area 8. The peripheral wall 14 may comprise one or more segments, may be continuous or discontinuous, and may delimit one or several central areas by suitably adapting its shape and the path it follows on the outer face 6 of the support element 2. The peripheral wall 14 is for example made in a single piece with the support element 2.

The skin 12 comprises at least one peripheral area 16 that extends between the foam layer 10 and the peripheral wall 14 so as to maintain the skin 12 on the foam layer 10. Such a peripheral area 16, which is invisible from the outside of the trim element, also enables an aesthetic transition between the central area 8 covered by the foam layer 10 and the area surrounding the central area 8 formed by the support element 2. When the peripheral wall 14 surrounds the entire central area 8 and the foam layer 10 is completely covered by the skin 12, the peripheral area 16 of the skin 12 forms the entire border of the skin 12. When the peripheral wall 14 has several segments spaced apart from each other, the skin 12 may be cut accordingly to provide a peripheral area 16 for each segment of the peripheral wall 14.

The inner face 4 of the support element 2 also comprises at least one tab 18 protruding from the inner face 4 in the vicinity of the central area 8. This tab 18 is not visible from the outside of the trim element 1 and therefore does not harm the aesthetics thereof. It may be made in a single piece with the support element 2 and is for example semi-rigid, i.e., slightly elastic, so as to allow it to be slightly deformed relative to the support element 2. According to the embodiment shown in FIGS. 1 and 3, the tab 18 extends substantially at the peripheral wall 14. The tab 18 extends opposite from an area of the support element extending around the central area 8, i.e., it starts from the edge of the central area 8 and extends toward the outside of that central area 8. According to the embodiment shown in the figures, the tab 18 comprises a through opening 20, the axis of which is substantially perpendicular to the general direction of the tab 18. The inner face 4 of the support element 2 may comprise several tabs 18 distributed around the central area 8. If the support element 2 comprises several central areas 8, the inner face 4 for example comprises at least one tab 18 per central area 8, said tab 18 extending in the vicinity of the corresponding central area 8, protruding from the inner face 4. Such a tab 18 and its opening 20 can for example serve as positioning and/or fastening elements for the trim element 1 in its environment, for example the body of the vehicle, but it is primarily used during the production of the trim element 1, as will now be described relative to FIG. 3.

Figure 3:
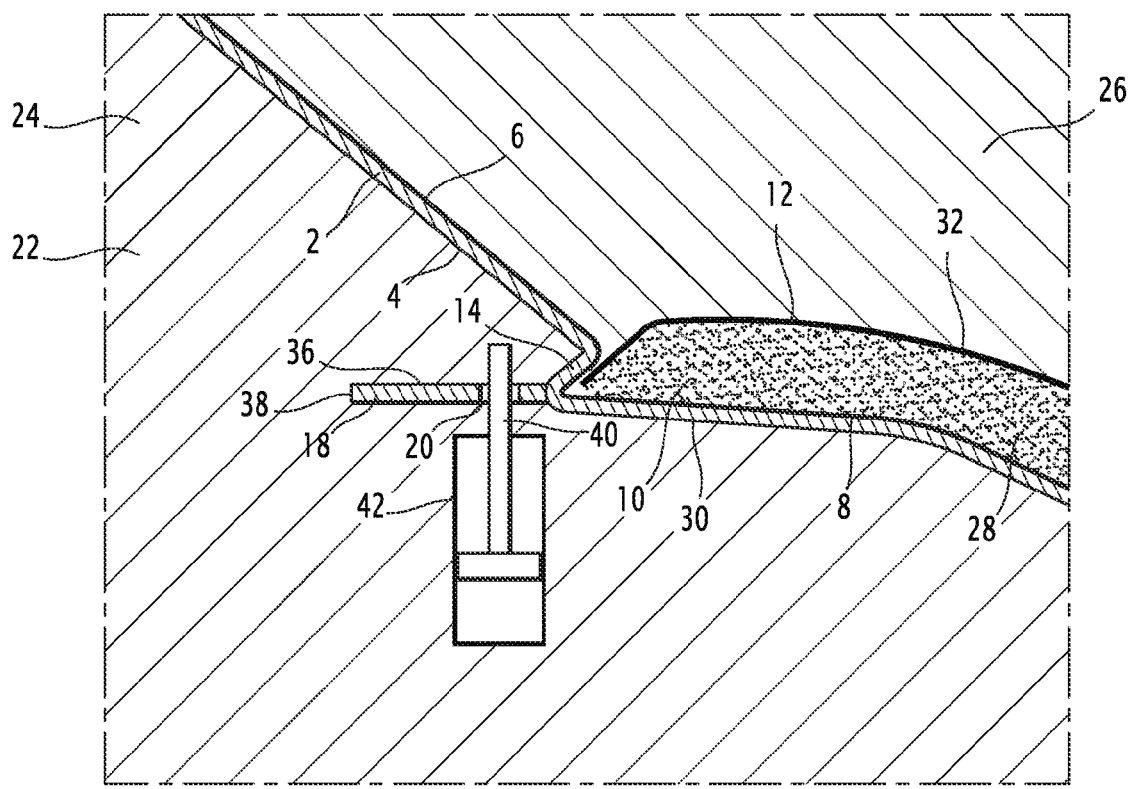
FIG. 3 is a diagrammatic cross-sectional illustration of part of a tool for producing the trim element of FIG. 1.

FIG. 3 shows a production tool 22 for producing the trim element 1 described above, more particularly a tool for producing the foam layer(s) 10 covering the central area(s) 8 provided on the outer face 6 of the support element 2.

Aside from means for receiving the tab 18, described later, the production tool 22 is traditional for this type of application and comprises a first portion 24 and a second portion 26 defining at least one foaming cavity 28 between them inside which the foam layer 10 is designed to be formed. The first and second portions 24 and 26 are for example movable relative to one another between an open position, in which the foaming cavity 28 is open and in which the support element 2 can be placed in or removed from the tool 22, and a closed position, in which the foaming cavity 28 is hermetically sealed. It will be understood that the first and second portions 24 and 26 define a number of foaming cavities 28 between them equal to the number of foam layers 10 to be produced, i.e., as many as there are central areas 8. In the rest of the description, only a single foaming cavity 28 will be described, any other such cavities being similar.

The foaming cavity 28 is delimited by a first inner wall 30 formed by the wall of the first portion 24 extending opposite the second portion 26 and by a second inner wall 32 formed by the wall of the second portion 26 extending opposite from the first portion 24.

The first inner wall 30 is designed to receive the inner face 4 of the support element 2 and has a shape substantially complementary to that of the inner face 4 of the support element 2. In the foaming cavity 28, the first inner wall 32 is substantially in the shape of the central area 8.

In the closed position of the tool 22 when the support element 2 is positioned against the first inner wall 30, in the foaming cavity 28, the second inner wall 32 extends opposite and at a distance from the outer face 6 of the central area 8 so as to define a space therewith assuming the form of the foam layer 10 to be produced. When the foam layer 10 must be covered by a skin 12, that skin 12 is designed to be pressed against the second inner wall 32 during foaming.

Outside the foaming cavity 28, the first inner wall 30 and the second inner wall 32 are respectively pressed against the inner face 4 and the outer face 6 of the support element 2, such that the foaming cavity 28 is hermetically sealed when the support element 2 is positioned in the tool 22 and the first and second portions 24 and 26 are in the closed position, as shown in FIG. 3.

The first portion 24 also comprises a receiving area 36 for the tab 18 protruding from the inner face 4 of the support element 2. The cooperation of the tab 18 with the receiving area 36 ensures correct positioning of the central area 8 of the support element 2 in the foaming cavity 28 such that the foam layer 10 is produced precisely on that central area 8 and not to the side. Of course, the first portion 24 comprises as many receiving areas 36 as there are tabs 18 on the support element 2.

The receiving area 36 is for example formed by a slit 38 for receiving the tab 18, that slit 38 having a shape substantially complementary to that of the tab 18. Thus, when the support element 2 is placed against the first inner wall 30 of the first portion 24, it is ensured that the tab(s) 18 are inserted into the corresponding slit(s) 36, which guarantees correct positioning of the central area(s) 8 in the corresponding foaming cavity or cavities 28 and blocking of the support element 2 against the first inner face 32. The deformability of the tabs 18 facilitates their insertion into the slits 38.

To improve the positioning and blocking of a tab 18 in a receiving area 36, the latter may also comprise a blocking element 40 movable between a retracted position and an upright position in which the blocking element 40 is inserted into the opening 20 of the tab 18. The blocking element 40 is for example formed by a lug translatable in a cylinder 42 formed in the first portion 24 of the tool 22. In the retracted position, the tip of the lug extends inside the cylinder or is flush with the first inner wall 30 or extends protruding slightly in the receiving area 36 and in the upright position, the lug extends in the receiving area 36 while passing through the opening 20 of the tab 18, thereby ensuring correct positioning of the tab 18 in the receiving area 36 and therefore of the central area 8 in the foaming cavity 28.

According to one embodiment, the cylinder is provided with a position sensor for the lug arranged to be activated when the lug is in the upright position. Such a sensor makes it possible to guarantee that the tab 18 is properly placed in the slit 38 such that the opening 20 is opposite the lug, which can then enter its upright position passing through the opening 20. If the lug does not reach its upright position, for example because the opening 20 is not positioned opposite it and the lug abuts against the tab 18, this means that the tab 18, and therefore the central area 8, are incorrectly positioned and that problem should be resolved before closing the tool 22 and performing foaming in the foaming cavity. The sensor is for example formed by a switch closed by an element of the lug when the lug is in the upright position or by another type of position sensor.

Once the tab(s) 18 are correctly positioned, the tool 22 can be closed and the injection of a precursor foam material in the foaming cavity 28 may occur traditionally between the outer face 6 of the support element 2 and the inner face of the skin 12, capturing the peripheral area 16 of the skin 12 between the foam layer 10 and the peripheral wall 14 of the support element 2.

Figure 2:
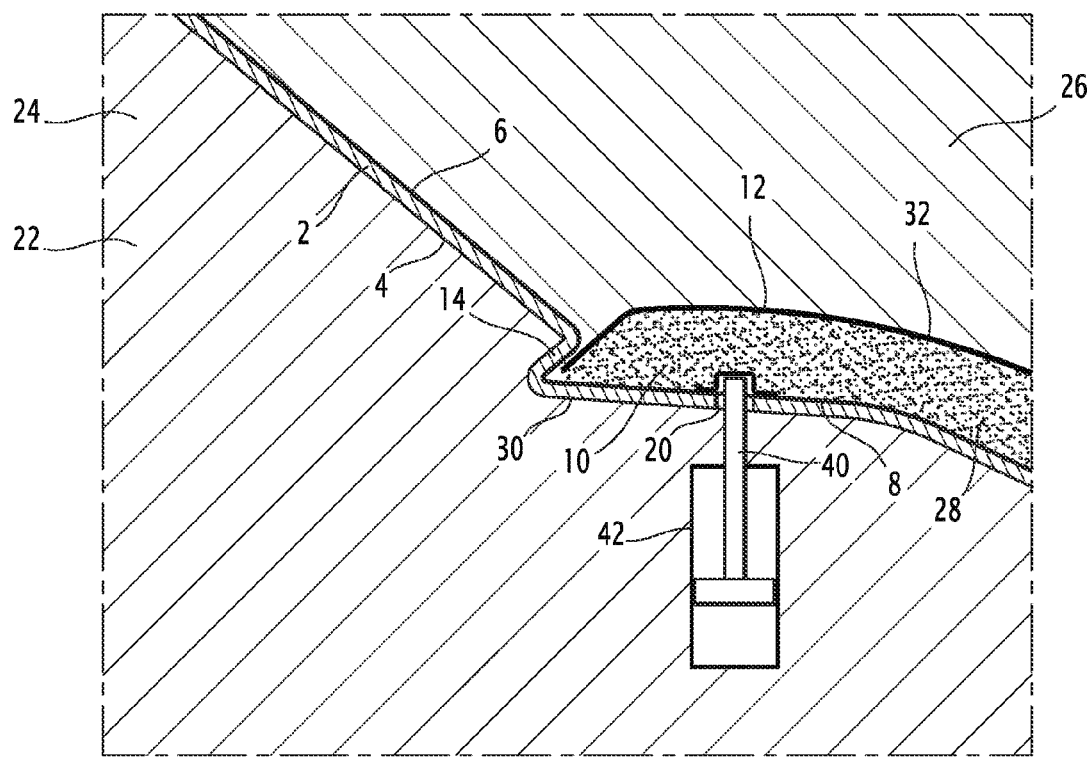
FIG. 2 is a diagrammatic cross-sectional illustration of part of a production tool for producing a trim element according to the prior art.

The positioning of the central area 8 being done using the tab(s) 18, it is not necessary to pierce the central area 18, as was the case in the prior art and as is illustrated in FIG. 2. There is thus no risk of leakage of the foam and it is not necessary to add covering elements on the outer face of the trim element before injecting foam into the foaming cavity. Production costs are therefore reduced and the production rhythms can be increased.

The invention claimed is:

1. A trim element comprising a support element made in a single piece, having an inner face and an outer face, said support element comprising a central area covered, on the outer face thereof, by a layer of foam, and a peripheral area protruding from an edge of the central area and extending around the central area and not covered by foam, characterized in that the support element comprises a tab protruding from the inner face at the edge of the central area, said tab extending opposite the inner face of the peripheral area of the support element, said tab forming a positioning element for positioning the support element in a production tool of the trim element.

2. The trim element according to claim 1, characterized in that the central area is at least partially delimited by a peripheral wall extending over the outer face of the support element and at least partially surrounding the central area.

3. The trim element according to claim 2, characterized in that the peripheral wall substantially surrounds the entire central area.

4. The trim element according to claim 1, characterized in that the tab comprises at least one through opening positioned opposite the peripheral area of the support element extending around the central area.

5. The trim element according to claim 1, further comprising a skin covering the layer of foam.

6. The trim element according to claim 5, characterized in that the skin comprises a peripheral area, said peripheral area extending between the layer of foam and a peripheral wall of the support element.

7. The trim element according to claim 1, characterized in that the support element comprises another central area, said other central area being covered on the outer face thereof by a foam layer, at least one tab extending on the inner face of the support element near said other central area.

* * * * *